(12) United States Patent
Zheng

(10) Patent No.: US 8,565,573 B2
(45) Date of Patent: Oct. 22, 2013

(54) CABLE MANAGEMENT ASSEMBLY FOR CABLE CLUSTERS OF NETWORK EQUIPMENT

(75) Inventor: Johnny Zheng, SuZhou (CN)

(73) Assignee: CommScope, Inc. of North Carolina, Hickory, NC (US)

( * ) Notice: Subject to any disclaimer, the term of this patent is extended or adjusted under 35 U.S.C. 154(b) by 826 days.

(21) Appl. No.: 12/711,037

(22) Filed: Feb. 23, 2010

(65) Prior Publication Data

US 2010/0226616 A1  Sep. 9, 2010

(30) Foreign Application Priority Data

Mar. 6, 2009  (CN) .......................... 2009 1 0128519

(51) Int. Cl.
*G02B 6/00* (2006.01)
*H01B 7/00* (2006.01)

(52) U.S. Cl.
USPC .......................................... 385/137; 174/135

(58) Field of Classification Search
USPC .......................................... 385/137; 174/135
See application file for complete search history.

(56) References Cited

U.S. PATENT DOCUMENTS

| 6,568,542 B1 | 5/2003 | Chen | |
|---|---|---|---|
| 2006/0011380 A1* | 1/2006 | Pierce | 174/135 |

FOREIGN PATENT DOCUMENTS

| CN | 2522893 Y | 11/2002 |
|---|---|---|
| CN | 1392648 A | 1/2003 |
| EP | 1 021 050 | 7/2000 |
| WO | 01/74091 | 10/2001 |
| WO | WO 2008/072004 A1 | 6/2008 |

* cited by examiner

*Primary Examiner* — Mark A. Robinson
*Assistant Examiner* — Jerry Blevins
(74) *Attorney, Agent, or Firm* — Muncy, Geissler, Olds & Lowe PLLC

(57) ABSTRACT

A cable management assembly for cable clusters of network equipment includes a supporting and fixing component, at least one cable management component and cable constraint components. The fixing component is a metal bar, which may be removably hooked to a cable patch panel. The bar includes evenly distributed U-shaped sections, whose number corresponds to the number of cable management components. Each cable management components may be formed with a trough-shaped upper surface to cradle cables. The bottom of the surface may be provided with a U-shaped groove and two locking members. Each U-shaped section of the bar is passed into a corresponding U-shaped groove and two portions of the bar immediately adjacent to the U-shaped section are snapped into the two locking members so as to fix the cable management component to the bar. The cable constraint component may be a strap inserted through and hanging from a strap hole at a side of the corresponding cable management component. The free end of the strap may be looped over the cable cluster and passed through a via hole formed in the other end of the strap to secure the cable cluster into the trough-shaped surface of the cable management component.

20 Claims, 5 Drawing Sheets

CABLE MANAGEMENT ASSEMBLY FOR CABLE CLUSTERS OF NETWORK EQUIPMENT

FIELD OF TECHNOLOGY

The present invention relates to the technical field of the management of cable clusters, especially to the management of cable clusters of network equipment. In particular, the present invention relates to a cable management assembly for cable clusters of network equipment and a method of using the same.

DESCRIPTION OF RELATED ARTS

High density network cabling, such as UTP, ScTP, coax and fiber optic cabling, is being increasingly used in the computer communication industry to provide data, voice, video and/or audio information. Patch panels, network equipment enclosures and rack systems are well-known in the industry and provide management and organization of cables to and from equipment and/or cross-connect systems. These systems usually include a standard EIA 19", 23" or other distribution frame rack on which one or more patch panels, network equipment, fiber optic enclosures and the like are mounted. Therefore, many existing equipment, such as network equipment, etc., are connected with a lot of communication cables, these communication cables are crowded into a limited, narrow space about the network equipment, and are usually scattered and disorder, even in a tangle. The communication cables not only appear to be very messy, but are very troublesome to operate and maintain, such as removing or tracing a communication cable from a source to a destination. Also, the abundance of tangled communication cables can infer with the effective heat dissipation of the equipment. In order to ensure the long-term stable operation of the network equipment and in order to simplify the maintenance of the network equipment, it is necessary to manage these communication cables as efficiently as possible. Moreover, good cable management improves the appearance of the network equipment.

Most cable management devices of the existing network equipment adopt flexible wire clamps or short ropes to enlace the cables. When it is necessary to increase, decrease or rearrange the cables, e.g., due to the addition, removal or rearrangement of network equipment, the existing wire clamps are cut and new wire clamps are fixed to the new cable bundles. This process results in waste. Furthermore, the cables remain relatively close to the network equipment and still influence the effective heat dissipation of the network equipment.

Chinese patent CN01807344.1 (corresponding to WO2001074091) disclosed a cable manager providing horizontal cable management of adjacent patch panels or network equipment on network distribution racks. The cable manager includes a central section and a front cable routing section and is mountable on a network rack, such as an EIA rack, the front cable routing section extends from the front side of the central section and includes a plurality of spaced fingers having an arcuate surface that provides bend radius control, and a slit provides flexibility to the fingers. However, the above structure is relatively complex, and lacks flexibility, which is not conducive to its operation and maintenance. Moreover, when this device is mounted on a network patch panel, it can negatively influence the effective heat dissipation of the network equipment to reduce its life.

Chinese patent CN200720075369.4 disclosed a cable management device for communications cabinets comprising a U-bracket, a positioned slide plate, a compacting board and an adjusting screw. Two sides of the U-bracket have a long groove respectively. The flanges on two ends of the compacting board are positioned in the long grooves respectively and can slide in the long grooves. The U-bracket has at least one slot for positioning the positioned slide plate which is locked in the slot through its rectangular hole and rectangular slot, and is connected threadedly with the adjusting screw. The head of the adjusting screw props against the compacting board. This device is relatively troublesome to install and uninstall, which is not conducive to the capacity increase/decrease or changes in the positions of the network equipment. Moreover, many cables are relatively close to the network equipment to negatively influence the heat dissipation effect of the network equipment.

SUMMARY OF THE INVENTION

Therefore, it is an object of the present invention to provide a cable management device, which can manage cables in better order than the devices of the prior art; that is convenient to install and uninstall; that has a simple structure; that is flexible to assemble; that is convenient to use; that allows for easy capacity increase, capacity decrease, reordering and maintenance of the network equipment; and/or that permits good heat dissipation of the network equipment.

An object of the present invention is to overcome the problems and defects of the prior art mentioned above and to provide a a cable management assembly for cable clusters of network equipment and a method of using cable management assembly.

These and other objects are accomplished by a cable management assembly for cable clusters of network equipment. The assembly includes a supporting and fixing component, at least one cable management component and cable constraint components. The fixing component is a metal bar, which may be removably hooked to a cable patch panel. The bar includes evenly distributed U-shaped sections, whose number corresponds to the number of cable management components. Each cable management components may be formed with a trough-shaped upper surface to cradle cables. The bottom of the surface may be provided with a U-shaped groove and two locking members. Each U-shaped section of the bar is passed into a corresponding U-shaped groove and two portions of the bar immediately adjacent to the U-shaped section are snapped into the two locking members so as to fix the cable management component to the bar. The cable constraint component may be a strap inserted through and hanging from a strap hole at a side of the corresponding cable management component. The free end of the strap may be looped over the cable cluster and passed through a via hole formed in the other end of the strap to secure the cable cluster into the trough-shaped surface of the cable management component.

DETAILED DESCRIPTION OF THE PREFERRED EMBODIMENT

In order to understand the technical content of the present utility model clearly, the present utility model is further exemplified by reference to the following examples.

With reference to FIGS. 1-4, a cable management assembly for cable clusters of network equipment, according to the present invention, comprises a supporting and fixing component 1, mounted adjacent a cable receiving end of network equipment; at least one cable management component 2, mounted on the supporting and fixing component 1, to receive the cable cluster of the network equipment thereon; and cable constraint components 3, each mounted on a respective cable management component 2 or the supporting and fixing component 1, and used to restrict and fix a portion of the cable cluster placed on the cable management component 2.

It should be noted that the phrase "network equipment" in the present invention encompasses any type of equipment having communications cables, such as patch panels, switches, servers, fiber optic enclosures, routers and the like.

In one embodiment of the present invention, the supporting and fixing component 1 is a supporting and fixing bar 11. The fixing bar 11 is preferred because its structure is simple, light weight and saves materials. However, it should be noted that the supporting and fixing component 1 could be formed by other components having supporting and fixing functions, such as supporting and fixing solid plates, supporting and fixing grid plates, and so on.

Figure 1:
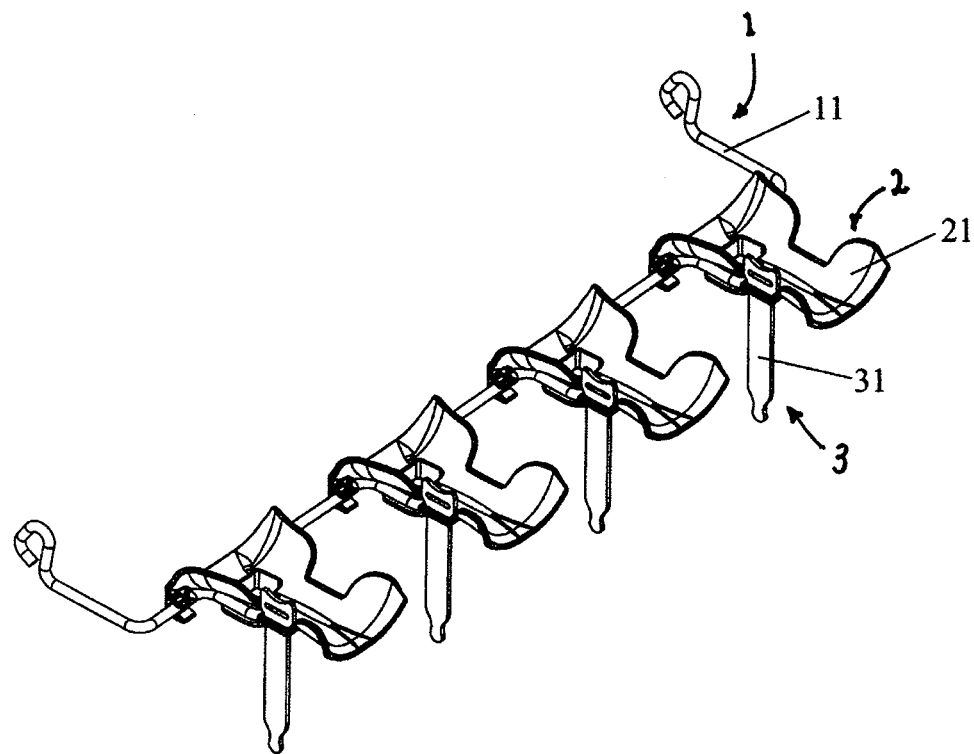
FIG. 1 is a perspective view of an embodiment of the cable management assembly for cable clusters of network equipment, according to the present invention.
Figure 2:
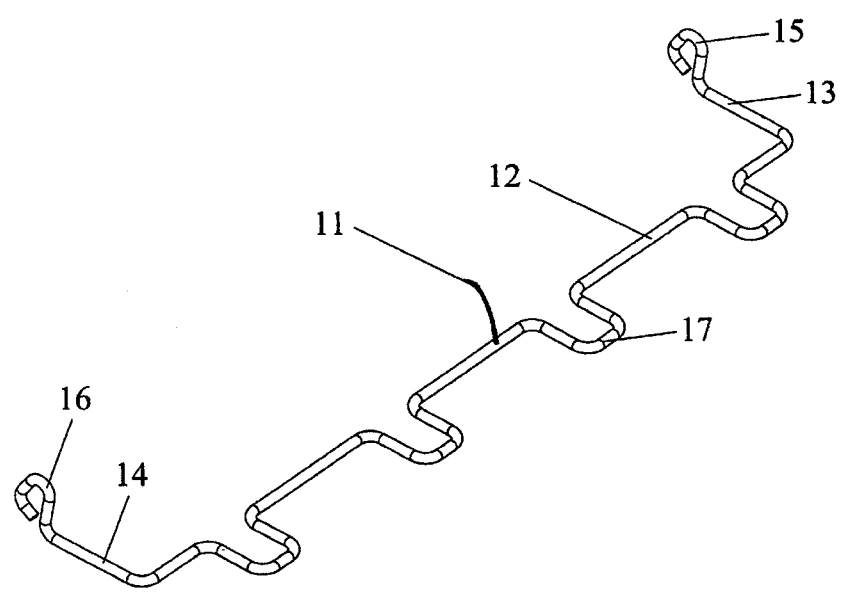
FIG. 2 is a perspective view of a supporting and fixing component of the embodiment as shown in FIG. 1.
Figure 3A:
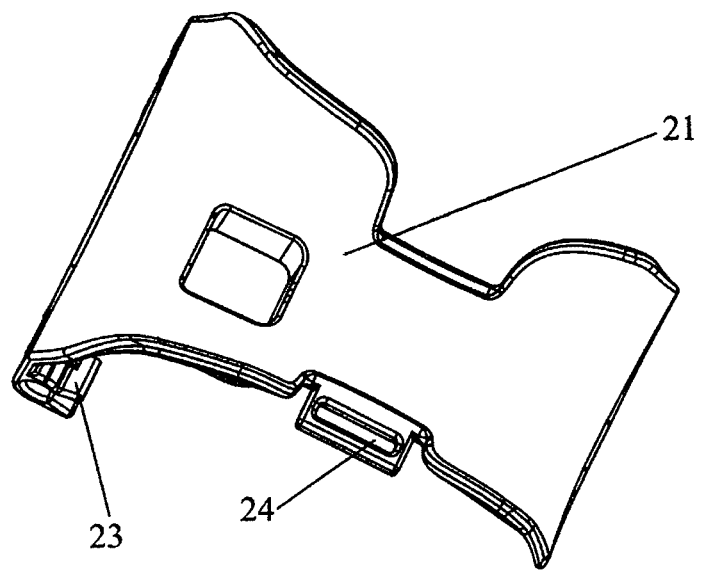
FIG. 3A is a perspective view of a cable management component of the embodiment as shown in FIG. 1.
Figure 3B:
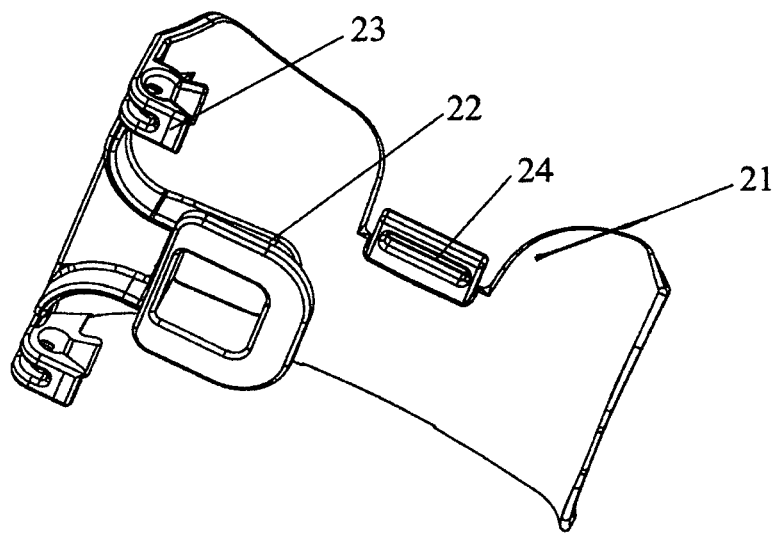
FIG. 3B is another perspective view of the cable management component of FIG. 3A.
Figure 4:
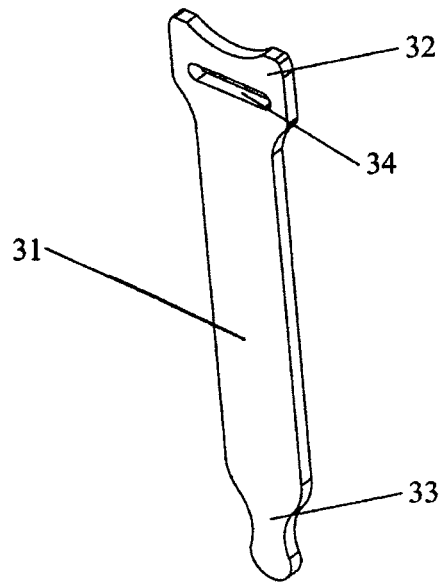
FIG. 4 is a perspective view of a cable constraint component of the embodiment as shown in FIG. 1.

In one embodiment of the present invention as best seen in FIG. 2, the supporting and fixing bar 11 comprises a middle supporting section 12. A first fixing section 13 and a second fixing section 14 are directly connected to two ends of the middle supporting section 12 respectively, and bend and extend in the same direction relative to the middle supporting section 12. The cable management components 2 are mounted on the middle supporting section 12. The first and second fixing sections 13 and 14 are mounted on the cable patch panel of the network equipment.

In one embodiment of the present invention, the end of the first fixing section 13 has a first hook part 15, the end of the second fixing section 14 has a second hook part 16. The first hook part 15 and the second hook part 16 can hook removably to features on two sides of the cable patch panel, respectively.

The supporting and fixing component 1 is preferably a metal component. Alternatively, the supporting and fixing component 1 can be made of other suitable materials. In one embodiment of the present invention, the supporting and fixing component 1 is a metal supporting and fixing bar, such that it can support a heavy load, and be solid and firm to support more things. Moreover, a metal supporting and fixing bar is convenient to process, and easy to form by bending.

In one embodiment of the present invention, the middle supporting section 12 of the supporting and fixing bar 11 has evenly distributed U-shaped sections, hereinafter referred to as U-shaped bending parts 17, whose number corresponds to the number of the cable management components 2. Each bending part 17 will be captured by a U-shaped blocking groove 22 of a cable management component 2. Each of the U-shaped bending parts 17 of the middle supporting section 12 is embedded into, or retained within, and held by the U-shaped blocking groove 22 of the corresponding cable management component 2, so that the cable management components 2 are supported and positioned on the supporting and fixing component 1. The U-shaped bending parts 17 could have other similar shapes, such as a V-shape or inverted Π-shape, etc. In one embodiment of the present invention, the middle supporting section 12 has four U-shaped bending parts 17, and can mount four cable management components 2 thereon, correspondingly.

In one embodiment of the present invention, the orientation of the opening of each of the U-shaped bending parts 17 of the middle supporting section 12 is the same or opposite to the bending and extending direction of the first fixing section 13 and the second fixing section 14. In a preferred embodiment of the present invention, the orientation of the opening of each of the U-shaped bending parts 17 of the middle supporting section 12 is the same to the bending and extending direction of the first fixing section 13 and the second fixing section 14. In this way, when the supporting and fixing bar 11 is fixed on the cable patch panel, the cable management components 2 fixed on the middle supporting section 12 are distanced from the cable patch panel, which is advantageous to the heat dissipation of the network equipment.

In one embodiment of the present invention, the cable management components 2 are cable management troughs 21. The longitudinal extending direction of the trough body of each of which is the same to that of the cable cluster placed in the trough body of that cable management trough 21. Thus, such a structure is more convenient to manage the cable cluster, and can prevent the cable cluster from bending unnecessarily to affect its service life.

In one embodiment of the present invention, the cross section of the trough body of each of the cable management troughs 21 is C-shaped or ⊏-shaped. In a preferred embodiment of the present invention, the cross section of the trough body of each of the cable management troughs 21 is C-shaped, to better accommodate a cable bundle 4 therein (See FIGS. 6A-6B).

In one embodiment of the present invention, the orientation of the opening of each of the U-shaped bending parts 17 of the middle supporting section 12 is the same to the longitudinal extending direction of the trough body of the corresponding cable management trough 21. Such a structure makes it simpler and more convenient to assemble, and more smooth to operate.

In one embodiment of the present invention, under the bottom of each of the cable management troughs 21 is further arranged at least one blocking or locking member 23. The blocking/locking members 23 are distributed at two sides of the corresponding U-shaped blocking groove 22. Two end parts of each of the U-shaped bending parts 17 of the middle supporting section 12 are embedded into, e.g., snapped into and held by the corresponding blocking/locking members 23, so as to be fixed in those blocking/locking members 23.

In one embodiment of the present invention, the blocking/locking members 23 are C-shaped calipers, the orientation of the opening of each of which is opposite to that of each of the U-shaped bending parts 17. Two end parts of each of the U-shaped bending parts 17 of the middle supporting section 12 are embedded into and held by the corresponding C-shaped calipers, so as to be snap fixed in those C-shaped calipers. In a preferred embodiment of the present invention, under the bottom of each of the cable management troughs 21 are arranged two C-shaped calipers. The opposite arrangement of the U-shaped bending part 17 and the C-shaped calipers causes the U-shaped bending part 17 to be embedded into and held by the corresponding U-shaped blocking groove 22, so as to be fixed in it. Simultaneously, two sections of the metal fixing bar 11, located at end parts of each of the U-shaped bending parts 17, are snapped into and held by the corresponding C-shaped calipers, so as to be fixed in them. In other words, the two locking members 23 may snap over and retain therein, two portions of the middle supporting section 12 of the metal bar 11, where the two portions of the bar 11 are located immediately adjacent to the U-shaped bending part 17.

In one embodiment of the present invention, each of the cable constraint components 3 is mounted on the corresponding cable management component 2. Therefore, each cable management component 2 is equipped with one cable constraint component 3, and such a structure is convenient to use and orderly to see.

In one embodiment of the present invention, the cable constraint components 3 are tough straps 31. The cable constraint components 3 also can be other suitable components, such as elastic loops, wire clamps, hook and loop fastener straps, and so on.

In one embodiment of the present invention, each of the tough straps 31 is inserted into a perforation 24 at a side of the corresponding cable management component 2. The perforation 24 may be formed as a hole having a complete perimeter edge or an open ended channel without a complete perimeter edge. Each strap 31 comprises a fixed end 32, the width of which is larger than the width of the perforation 24, and a free end 33 the width of which is smaller than the width of the perforation 24. That is to say, the strap 31 can hang in the corresponding perforation 24.

In a preferred embodiment of the present invention, the fixed end 32 has a via hole 34 to receive the free end 33, so that the free end 33 can be fixed to the fixed end 32. With such a structure, it is convenient to restrict and fix the cable bundles 4 placed in the cable management components 2. In a more optimized implementation, spaced lateral blocking protrusions are arranged on the free end 33, during the process of the free end 33 inserting into the via hole 34, the spaced lateral blocking protrusions can engage within the via hole 34 to prevent the free end 33 from withdrawing, so as to ensure the tight binding of the cable bundle 4 by the strap 31, in the same manner as a zip-tie style fastener, whereby teeth on flat side of the strap 31 leading up to the free end are ratcheted past a pawl disposed in the via hole 34. A releasable hook and loop style strap 31 is also preferred.

More preferably, the perforation 24 at the side of each of the cable management components 2 is a long-narrow hole, and the straps 31 are flat strips. The straps 31 also can be other suitable shapes, such as straps having a round cross section and so on.

The perforation 24 at the side of each of the cable management components 2 may be a long circular hole or a rectangular hole. In a preferred embodiment of the present invention, the perforation 24 at the side of each of the cable management troughs 21 receives the corresponding strap 31, and is a rectangular-shaped hole or channel. The strap 31 is a flat strap, whereby the flat surface thereof increases the contacting area with the cable bundle 4, so as to increase the frictional force between it and the cable bundle 4.

Figure 6A:
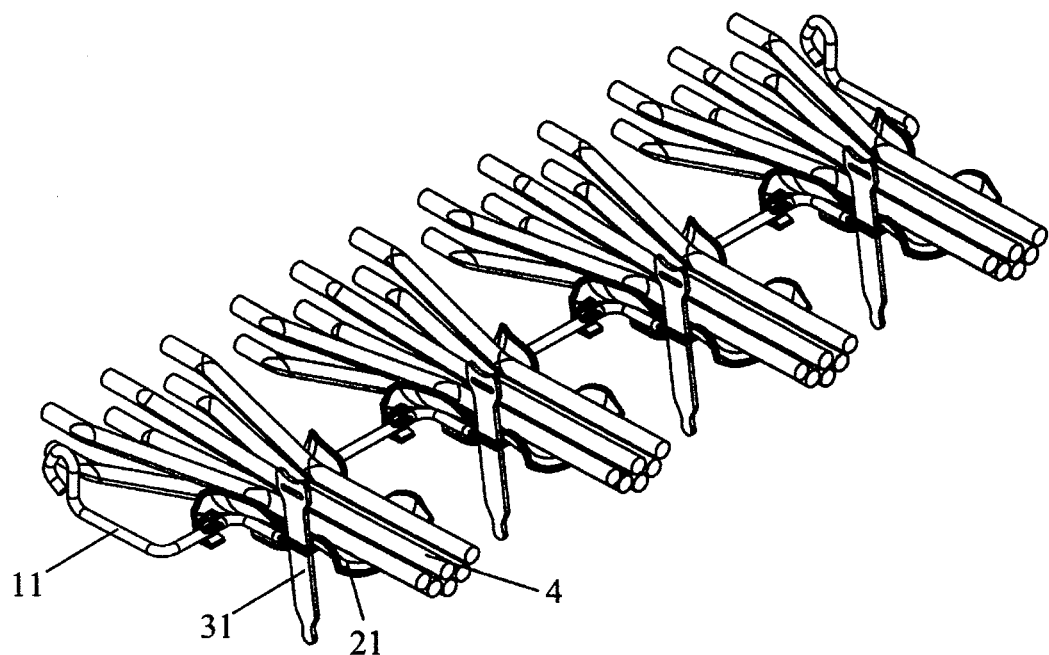
FIGS. 6A-6B are schematic views illustrating a using process of the embodiment as shown in FIG. 1.
Figure 6B:
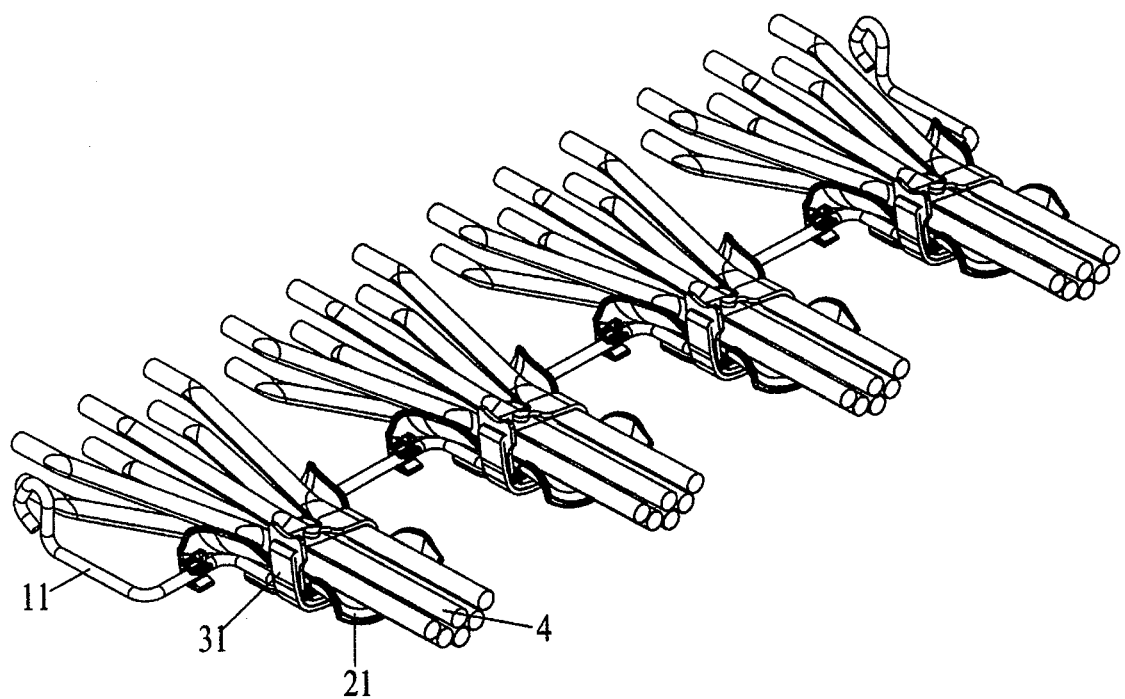

With reference to FIGS. 6A-6B, the cable management method for cable clusters of network equipment according to the present invention is illustrated. The method manages a portion of the cable cluster of network equipment, and comprises the steps of:

(1) Mounting the first fixing section 13 and the second fixing section 14 of the supporting and fixing bar 11 on the cable patch panel of the network equipment, so as to fix the supporting and fixing bar 11 on the cable patch panel of the network equipment;

(2) Selecting at least two adjacent cables from the cable cluster of the network equipment, assembling the cables to form a cable bundle 4, and placing the cable bundle 4 in one of the cable management components 2;

(3) Restricting the cable bundle 4 to fix it with the corresponding tough strap 31;

(4) Repeating the steps (2) and (3) for each cable management component 2, until the desired cable clusters are managed.

Preferably, the end of the first fixing section 13 of the supporting and fixing bar 11 has a first hook part 15, the end of the second fixing section 14 of that supporting and fixing bar 11 has a second hook part 16, and the first hook part 15 and the second hook part 16 fix supporting and fixing bar 11 on the cable patch panel, the detailed step is:

Hooking the first hook part 15 and the second hook part 16 on corresponding positions at two sides of the cable patch panel, respectively.

Preferably, the fixed end 32 of the tough strap 31 has a via hole 34, and the process of restricting the cable bundle 4 to fix it with the corresponding strap 31 comprises the steps of:

(11) Securing the cable bundle 4 with at least one loop of the free end 33 of the strap 31 around the cable bundle 4;

(12) Inserting the free end 33 of the strap 31 into the via hole 34 of the fixed end 32, so as to restrict and fix the cable bundle 4.

The cable management assembly for cable clusters of network equipment of the present invention can exclude the cable constraint components. In this case, the structure of the supporting and fixing component 1 is same as the above mentioned structure, so the same components are indicated by the same reference numerals. Each of the cable management components has a cable holding structure, which has a narrowed opening and/or the medial wall of which has at least one blocking piece. The blocking pieces are used, when the cable bundle 4 is placed in the cable holding structure, to prevent the cable bundle 4 from escaping from the cable holding structure.

In one embodiment of the present invention, the narrowed opening is arranged on the top or the side of the cable holding structure, and the blocking pieces are one blocking protrusion or at least two opposite-extending blocking protrusions fixed on the medial wall of the cable holding structure. In one preferred embodiment of the present invention, the narrowed opening is arranged on the top of the cable holding structure. With the narrowed top opening, the cable bundle 4 in the cable holding structure would be prevented from escaping from the cable holding structure.

In one preferred embodiment of the present invention, the cable holding structures are cable holding troughs. The longitudinal extending direction of the trough body of each is the same direction as that of the cable cluster placed in the trough body of that cable holding trough. In one more preferred embodiment of the present invention, the orientation of the opening of each of the U-shaped bending parts of the middle supporting section is the same to the longitudinal extending direction of the trough body of the corresponding cable holding trough. In one more preferred embodiment of the present invention, under the bottom of each of the cable holding trough is further arranged at least one blocking member. The blocking members are distributed at two sides of the correspondingly U-shaped blocking groove. Two end parts of each of the U-shaped bending parts of the middle supporting section are embedded into and blocked by the corresponding blocking members, so as to be fixed in those blocking members.

The supporting and fixing bar 11 of the present invention can removably hook two sides of the cable patch panel with the first hook part 15 of the first fixing section 13 and the second hook part 16 of the second fixing section 14. When used, it just needs to hook the supporting and fixing bar 11 on two sides of the cable patch panel. When unused or repaired, it can be detached very easily from the cable patch panel. Moreover, due to the supporting role of the supporting and fixing bar 11, the cable bundles 4 are supported in the cable management troughs 21 fixed on the supporting and fixing bar 11, so as to prevent the cables from being close to the network equipment to negatively affect the network equipment's heat dissipation.

The size of the cable management trough 21 of the present invention can be designed to hold 12×10D cables (having a diameter of 0.315 inch) or 4 Cat5e cables (having a diameter of 0.198 inch), which means that the cable management trough 21 can in general hold about 4 to 9 cables of different dimensions. That is to say, the cable management trough 21 is suitable for cables of different dimensions/diameters. Thus, the present invention is very convenient to use.

Figure 5A:
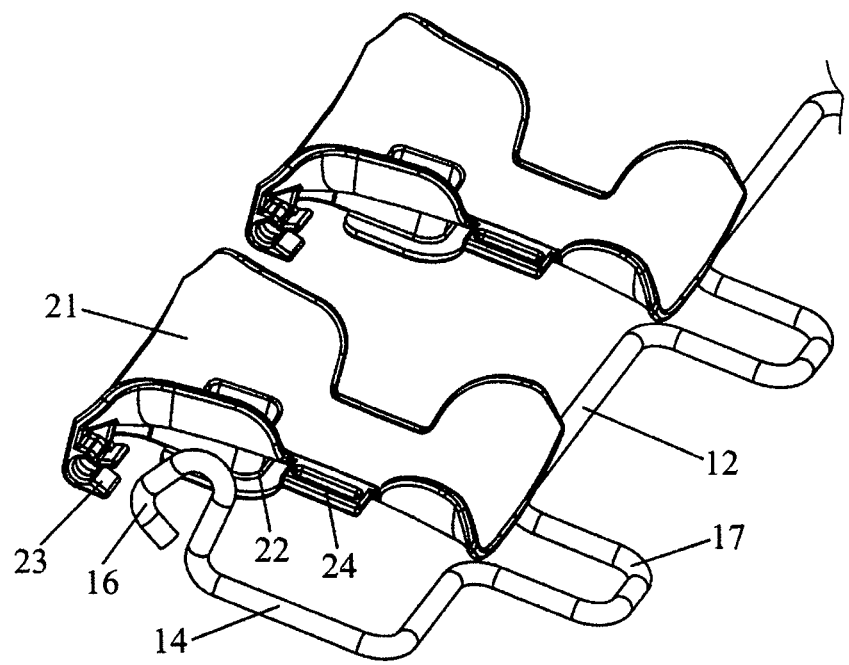
FIGS. 5A-5C are schematic views of an assembling process of the embodiment as shown in FIG. 1.
Figure 5B:
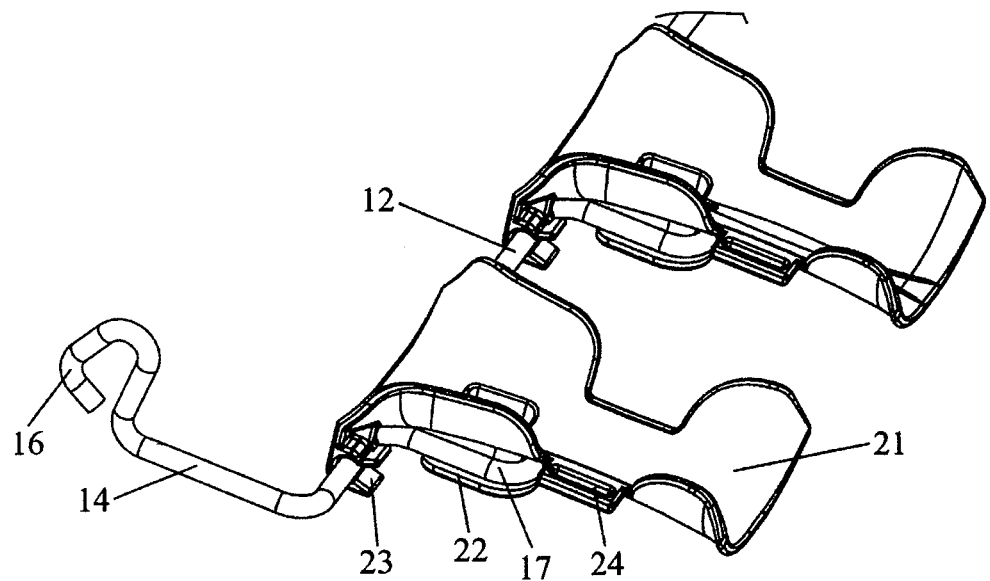

With reference to FIGS. 5A-5B, the cable management troughs 21 of the present invention can be mounted simply and firmly on the middle supporting section 12. It is only required to aim the U-shaped blocking groove 22 under the bottom of one of the cable management troughs 21 at the corresponding U-shaped bending part 17 of the middle supporting section 12, and slide the U-shaped bending part 17 into the U-shaped blocking groove 22 so as to be embedded/captured into and blocked by the U-shaped blocking groove 22. This engagement prevents the cable management trough 21 from moving upwardly relative to the U-shaped bending part 17. Two sections of the supporting and fixing bar 11 at end parts of the U-shaped bending part 17 of the middle supporting section 12 are snap embedded into and held by two C-shaped calipers at two sides of the bottom of that cable management trough 21. Such an arrangement can, to a certain degree, prevent the cable management trough 21 from moving relative to the U-shaped bending part 17 to withdraw from the C-shaped calipers. By this arrangement, the cable management trough 21 is supported and positioned on the supporting and fixing bar 11.

Furthermore, the cable management troughs 21 of the present invention can be detached relatively easily from the middle supporting section 12 of the supporting and fixing bar 11. To remove, one needs only to apply enough force opposite to the force in mounting to withdraw one of the U-shaped bending parts 17 from the corresponding U-shaped blocking groove 22 and the C-shaped calipers so as to separate that cable management trough 21 from the supporting and fixing bar 11.

Therefore, the above-described structure is flexible to assemble, convenient to use, and advantageous to enable capacity increase, decrease and movement of network equipment and maintenance of the network equipment. As long as the supporting and fixing bar 11 has enough U-shaped bending parts 17, when the capacity is increased, one only needs to add the cable management troughs 21 correspondingly. When the number of cables is decreased, one only needs to decrease the cable management troughs 21 correspondingly. In addition, the decrease of the cable management troughs 21 is advantageous to the heat dissipation of the network equipment.

Figure 5C:
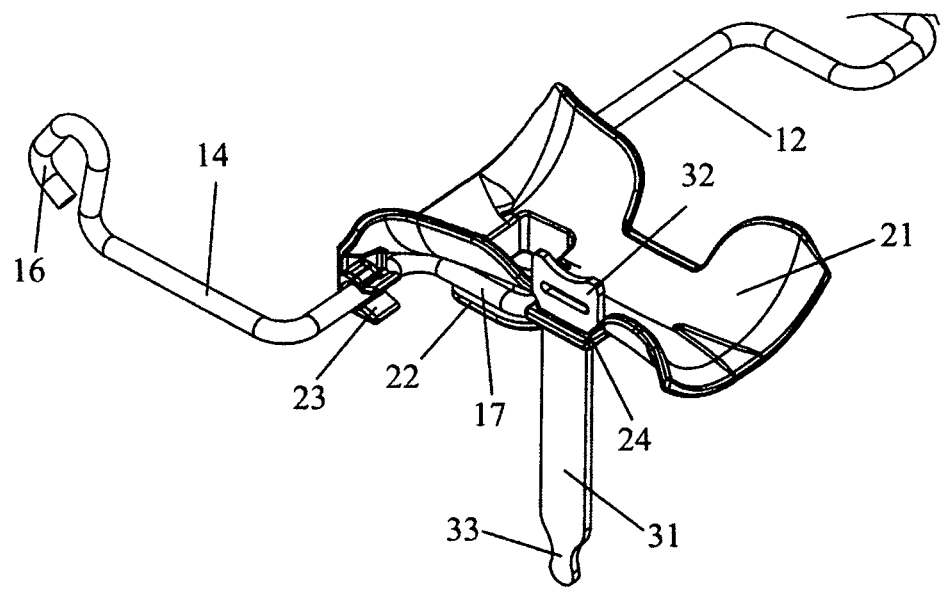

Referring to FIG. 5C, the free end 33 of each of the straps 31 is inserted into the perforation 24 at the side of the corresponding cable management trough 21. The relatively larger fixed end 32 cannot pass through the perforation 24 and hence abuts and rests on the edges forming the perforation 24. Therefore, the strap 31 of the present invention hangs in the perforation 24. Thus, it will be very convenient to fix or release the cable bundle 4 because the strap 24 can be secured and released time after time, especially if the strap 31 is a hook and loop strap.

To sum up, the cable management assembly for cable clusters of the present invention can manage cables in good order. At the same time, the cable management assembly is convenient to install and uninstall, has a simple structure, is flexible to assemble, convenient to use, and advantageous to permit capacity increase/decrease and maintenance of network equipment, and permits a good heat dissipation effect of the network equipment.

While the present invention has been particularly shown and described with references to preferred embodiments thereof, it will be understood by those skilled in the art that various changes in form and details may be made therein without departing from the spirit and scope of the invention as defined by the claims. It is clearly understood therefore that the same is by way of illustration and example only and is not to be taken by way of limitation.

I claim:

1. A cable management assembly for cable clusters of network equipment, the management assembly comprising:
   a supporting and fixing component for mounting to network equipment, the supporting and fixing component comprising a plurality of projections connected by a plurality of links;
   at least one cable management component, mounted on said supporting and fixing component, and presenting a surface onto which to place a cable cluster of the network equipment; and
   at least one cable constraint component, mounted on said cable management component, and used to restrict and fix a portion of the cable cluster placed onto said cable management component,
   wherein, said at least one cable management component includes at least one hook hooked onto at least one of the plurality of links and a support surface resting on and supported by one of the plurality of projections.

2. The cable management assembly for cable clusters of network equipment according to claim 1, wherein said supporting and fixing component is a formed as a bar.

3. The cable management assembly for cable clusters of network equipment according to claim 2, wherein said bar has a middle section, a first fixing section and a second fixing section, wherein said first and second fixing sections are formed at two ends of said middle section respectively, and wherein said first and second fixing sections have first and second hook parts, respectively, for mounting on a cable patch panel of the network equipment.

4. The cable management assembly for cable clusters of network equipment according to claim 1, wherein said cable constraint components are straps.

5. The cable management assembly for cable clusters of network equipment according to claim 4, wherein each of said straps is inserted into a strap perforation on a corresponding cable management component, and wherein each of said straps includes a first end retained at said strap perforation and a second free end to pass over cables on said cable management component.

6. The cable management assembly for cable clusters of network equipment according to claim 5, wherein said first end of said strap has a via hole to receive said second free end of said strap, so that said second free end of said strap can be fixed to said first end of said strap.

7. The cable management assembly for cable clusters of network equipment according to claim 6, wherein said strap perforation is rectangular in shape and said straps are generally flat strips with an enlarged head at said first end of said strip.

8. The cable management assembly for cable clusters of network equipment according to claim 7, wherein an engagement between said second end of said strap within said via hole of said first end of said strap is accomplished via a ratcheting engagement.

9. A cable management assembly for cable clusters of network equipment, characterized in that, the management assembly comprises:
   a supporting and fixing component for mounting to network equipment;
   at least one cable management component, mounted on said supporting and fixing component, and presenting a surface onto which to place a cable cluster of the network equipment; and
   at least one cable constraint component, mounted on said cable management component, and used to restrict and fix a portion of the cable cluster placed onto said cable management component,
   wherein said supporting and fixing component is a formed as a bar, and
   wherein a middle section of said bar has evenly distributed U-shaped bending parts whose number is corresponding to a number of said cable management components, wherein under a bottom of each cable management component is arranged a groove, and each of said U-shaped bending parts of said middle section is retained within and held by said groove of the corresponding cable management component, so that said cable management components are supported and positioned on said middle section of said bar.

10. The cable management assembly for cable clusters of network equipment according to claim 9, wherein each surface of each cable management component, onto which is placed the cable cluster of the network equipment, has a trough shape.

11. The cable management assembly for cable clusters of network equipment according to claim 9, wherein each cable management component further includes first and second locking members, said first and second locking members are distributed to sides of said groove and attach to portions of said middle section of said bar to sides of said U-shaped bending part, when said U-shaped bending part is retained within said groove of the respective cable management component.

12. The cable management assembly for cable clusters of network equipment according to claim 11, wherein said locking members are C-shaped calipers shaped to snap over said bar immediately adjacent to said sides of said U-shaped bending parts, and wherein an orientation of an opening of each of said C-shaped calipers is opposite to an opening direction of each of said U-shaped bending parts.

13. A cable management assembly supporting cable clusters of network equipment, comprising:
   network equipment;
   a supporting and fixing component mounted to said network equipment, said supporting and fixing component including a plurality of projections;
   at least one cable management component, mounted on said supporting and fixing component, and presenting a surface onto which to place a cable cluster of said network equipment, said at least one cable management component including at least one groove on a side opposite said surface in which one of said plurality of projections extends; and
   at least one cable constraint component, mounted on said cable management component, and used to restrict and fix a portion of the cable cluster placed onto said cable management component.

14. The cable management assembly supporting cable clusters of network equipment according to claim 13, wherein said supporting and fixing component is a formed as a bar.

15. The cable management assembly supporting cable clusters of network equipment according to claim 14, wherein said network equipment includes a cable patch panel, wherein said bar has a middle section, a first fixing section and a second fixing section, wherein said first and second fixing sections are formed at two ends of said middle section respectively, and wherein said first and second fixing sections have first and second hook parts, respectively, mounted to said cable patch panel.

16. The cable management assembly supporting cable clusters of network equipment according to claim 15, wherein said first and second hook parts enter holes formed in a front face of said cable patch panel, which are located proximate lateral sides edges of said cable patch panel.

17. The cable management assembly supporting cable clusters of network equipment according to claim 14, wherein said plurality of projections comprise a plurality of evenly distributed U-shaped bending parts whose number corresponds to a number of said cable management components, wherein under a bottom of each cable management component is arranged one of the at least one groove, and each of said U-shaped bending parts is retained within and held by said one of the at least one groove of the corresponding cable management component, so that said cable management components are supported and positioned on said bar.

18. The cable management assembly supporting cable clusters of network equipment according to claim 17, wherein each surface of each cable management component, onto which is placed the cable cluster of said network equipment, has a trough shape.

19. The cable management assembly for cable clusters of network equipment according to claim 17, wherein each cable management component further includes first and second locking members, said first and second locking members are distributed to sides of said groove and attach to portions of said bar to sides of said U-shaped bending part when said U-shaped bending part is retained within said groove of a respective cable management component, wherein said locking members are C-shaped calipers shaped to snap over said bar immediately adjacent to sides of said U-shaped bending parts, and wherein an orientation of an opening of each of said C-shaped calipers is opposite to an opening direction of each of said U-shaped bending parts.

20. The cable management assembly for cable clusters of network equipment according to claim 13, wherein said cable constraint components are straps, wherein each of said straps is inserted into a strap perforation on a corresponding cable management component, and wherein each of said straps includes a first end with a first width larger than the size of said strap perforation and a second end with a second width smaller than the size of said strap perforation, such that said second end passes through said strap perforation until said first end abuts said strap perforation.

* * * * *